United States Patent
Grummons et al.

(10) Patent No.: US 11,212,317 B2
(45) Date of Patent: Dec. 28, 2021

(54) EXTENDING MANAGED SWITCHING NETWORK TO A VIRTUALIZATION LAYER IN A COMPUTER

(71) Applicant: INTERNATIONAL BUSINESS MACHINES CORPORATION, Armonk, NY (US)

(72) Inventors: Samuel S Grummons, Newtown, CT (US); Annuschka Bork, NYC, NY (US); Nader M. Nassar, Yorktown Heights, NY (US); Todd D Deloach, Bethel, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/679,712

(22) Filed: Nov. 11, 2019

(65) Prior Publication Data

US 2021/0144179 A1 May 13, 2021

(51) Int. Cl.
*H04L 29/06* (2006.01)
*H04L 12/46* (2006.01)
*H04L 12/931* (2013.01)

(52) U.S. Cl.
CPC .......... *H04L 63/20* (2013.01); *H04L 12/4633* (2013.01); *H04L 12/4641* (2013.01); *H04L 49/70* (2013.01); *H04L 63/0272* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 5,394,402 | A | 2/1995 | Ross |
| 6,151,322 | A | 11/2000 | Viswanath et al. |
| 7,131,141 | B1 | 10/2006 | Blewett et al. |
| 8,893,261 | B2 | 11/2014 | Fainkichen et al. |
| 9,641,599 | B2 | 5/2017 | Wesley et al. |
| 9,699,277 | B2 | 7/2017 | Banavalikar et al. |
| 10,165,055 | B2 | 12/2018 | Singhal |
| 2013/0034094 | A1 | 2/2013 | Cardona et al. |
| 2015/0124812 | A1* | 5/2015 | Agarwal ............... H04L 45/38 370/392 |
| 2017/0371698 | A1* | 12/2017 | Paolino ................ H04L 49/70 |

(Continued)

FOREIGN PATENT DOCUMENTS

| | | | | |
|---|---|---|---|---|
| CN | 105656914 A | * | 6/2016 | ............ H04L 63/02 |
| CN | 110912725 A | * | 3/2020 | ......... H04L 41/0803 |
| WO | 200217571 A1 | | 2/2002 | |

OTHER PUBLICATIONS

Marvin Moser et al., "Extending Software Defined Networking to End User Devices", IEEE, Aug. 2015 (Year: 2015).*

(Continued)

*Primary Examiner* — Aaron N Strange
*Assistant Examiner* — Mohammad Yousuf A. Mian
(74) *Attorney, Agent, or Firm* — Griffiths & Seaton PLLC

(57) ABSTRACT

Embodiments for extending managed switching network in a computing environment. Security policy and authentication functionality may be extended and implemented in a virtualization layer of a virtual switch locally installed on a computer of a user for network switching in a network.

9 Claims, 9 Drawing Sheets

(56) References Cited

U.S. PATENT DOCUMENTS

2018/0191680 A1* 7/2018 Ahuja ................. H04L 43/028
2018/0343319 A1* 11/2018 Kutty ..................... H04L 41/12

OTHER PUBLICATIONS

Wenyu Shen et al., "vConductor: An Enabler for Achieving Virtual Network Integration as a Service", IEEE, Feb. 2015 (Year: 2015).*
Costache et al. "Software-Defined Networking of Linux Containers" IEEE (Year: 2014).*
Lombardo et al. "An Open Framework to Enable NetFATE (Network Functions At The Edge)", IEEE (Year: 2015).*

* cited by examiner

EXTENDING MANAGED SWITCHING NETWORK TO A VIRTUALIZATION LAYER IN A COMPUTER

BACKGROUND OF THE INVENTION

Field of the Invention

The present invention relates in general to computing systems, and more particularly to, various embodiments for extending managed switching network to a virtualization layer in a computer in a computing environment.

Description of the Related Art

A popular type of large-scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

SUMMARY OF THE INVENTION

Various embodiments for extending managed switching network in a computing environment are provided. In one embodiment, by way of example only, a method for extending the security functionality of campus network switching to the virtualization layer in the computer environment, again by a processor, is provided. Security policy and authentication functionality may be extended and implemented in a virtualization layer of a virtual switch locally installed on a computer of a user for network switching in a network.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
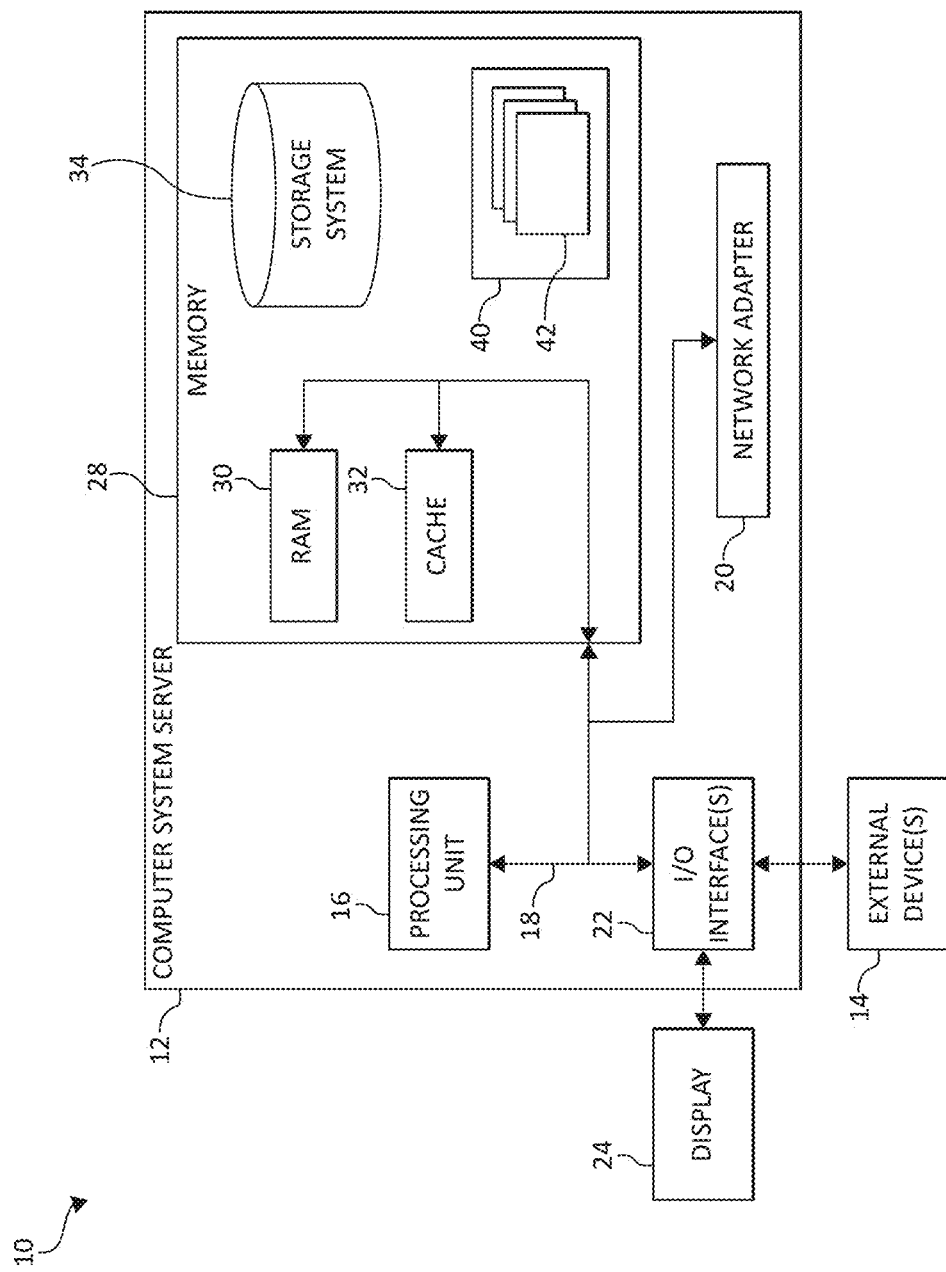
FIG. 1 is a block diagram depicting an exemplary computing node according to an embodiment of the present invention.

The emergence of cloud computing changes the paradigm of how people utilize computing resources. The public cloud has been created by service providers to allow access to those who need such computing resources on demand. As aforementioned, access to cloud resources is provided through the Internet or private network connections or through co-location of fixed infrastructure held as a base, augmented by on demand resources when needed. The underlying infrastructure, however, is a set of fixed computing configurations which provide inflexibility when scaling or descaling demands are appropriate.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services.

Cloud computing environments are typically a cluster of compute nodes integrated via networking fronted by a service layer. The compute nodes are connected via network interface cards ("NICs") to a set of network switches. In addition, storage nodes are typically attached to network gear or, alternatively, the compute nodes can also serve as storage nodes.

In cloud computing environments, the infrastructure is commonly consumed via a portal as a virtual infrastructure (e.g., the IaaS), virtual compute, virtual network and virtual storage and isolates the end user from the specifics of the underlying hardware and services. In turn, the burden of isolation in the face of multi-tenancy is placed on the cloud provider. To achieve this isolation, the cloud provider utilizes hypervisors that run on each compute.

Hypervisors or "virtual machine monitor" ("VMM") are computer software, firmware, and/or hardware that deploy virtual machines to provide the virtual compute. A computer on which a hypervisor runs one or more virtual machines is called a host machine. At the networking level, the hypervisor can translate virtual networking information into encapsulation rules and actions that are either executed as a software module as part of the hypervisor networking stack or the hypervisor configures rules on the NIC, which increasingly have capabilities to run soft-switches and tunneling engines (e.g., encapsulation) to transport virtual traffic over physical connections.

In this context, most, if not all enterprises (e.g., businesses, governments, academic institutions, organizations, etc.) today use protected networks, device controls, and policies to secure their data and activities. Policies govern how access to protected networks is granted, and device controls ensure the machines accessing a protected network are compliant with the security policies. As such, the mitigation of unmanaged machines accessing protected networks is a common, but often complicated security pursuit. Virtual machines ("VMs") are a known vulnerability in this space. VMs, by design, piggyback on the resources of the physical host machine (e.g., meaning the VM's gain network access when the host machine authenticates to a wireless access point. In theory, any machine needing network access must authenticate, but VMs bypass this policy. This is how unmanaged VMs get introduced to a protected network.

Accordingly, the present invention provides a novel solution that require VMs to authenticate independent of the physical host machine. By installing a virtual managed switch to a computer (e.g., a desktop), the present invention provides network-level authentication of VMs on managed end-user workstations. This virtual managed switch becomes a control that enables enterprises to ensure that VMs adhere to network access policies.

Additionally, various embodiments are provided in a cloud computing environment. In one embodiment, the present invention extends the security functionality of campus network switching to the virtualization layer in the computer environment. In one aspect, various technology (e.g., software defined networking, managed virtual switches, authentication servers such as, for example, firewall and radius servers, etc.) may be used to extend to the virtualization component of the user workstation. Thus, unlike current technology where virtual switches require a network administrator to log in and make the appropriate configurations, the present invention provides a novel solution to allow a non-privileged user to download a virtual managed virtual switch application, sign into the virtual managed virtual switch application, and retrieve various network policies (e.g., software defined networking ("SDN") policies which extend a network (e.g., a corporate campus network) and remote access services onto a virtual switching layer of the user's computer/workstation.

In an additional aspect, the present invention provides for security policy and authentication functionality may be extended and implemented in a virtualization layer of a virtual switch locally installed on a computer of a user for network switching in a network. Said differently, the present invention extends the security functionality of campus network switching to a virtualization layer in the computer (e.g., desktop computer) environment. A virtual switch may be downloaded and installed on the end user's workstation (e.g., desktop computer). An authentication operation and a cloud-based software defined networking controller, which enables a user to sign into the managed switch application, may retrieve corporate software-defined networking configurations, and consume corporate networking access in a virtual environment as a service.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment or Internet of Things (IoT) network environment. Rather, embodiments of the present invention are capable of being implemented in conjunction with any other type of computing environment now known or later developed. It should be noted that the IoT is an emerging concept involving computing devices that may be embedded in objects, such as appliances, and connected through a network. An IoT network may include one or more IoT devices or "smart devices", which are physical objects such as appliances with computing devices embedded therein. Many IoT devices are independently operable, but they also may be paired with a control system or with a distributed control system such as one running over a cloud computing environment. The control system may include an end-to-end flow monitoring mechanism similar to the one described herein.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
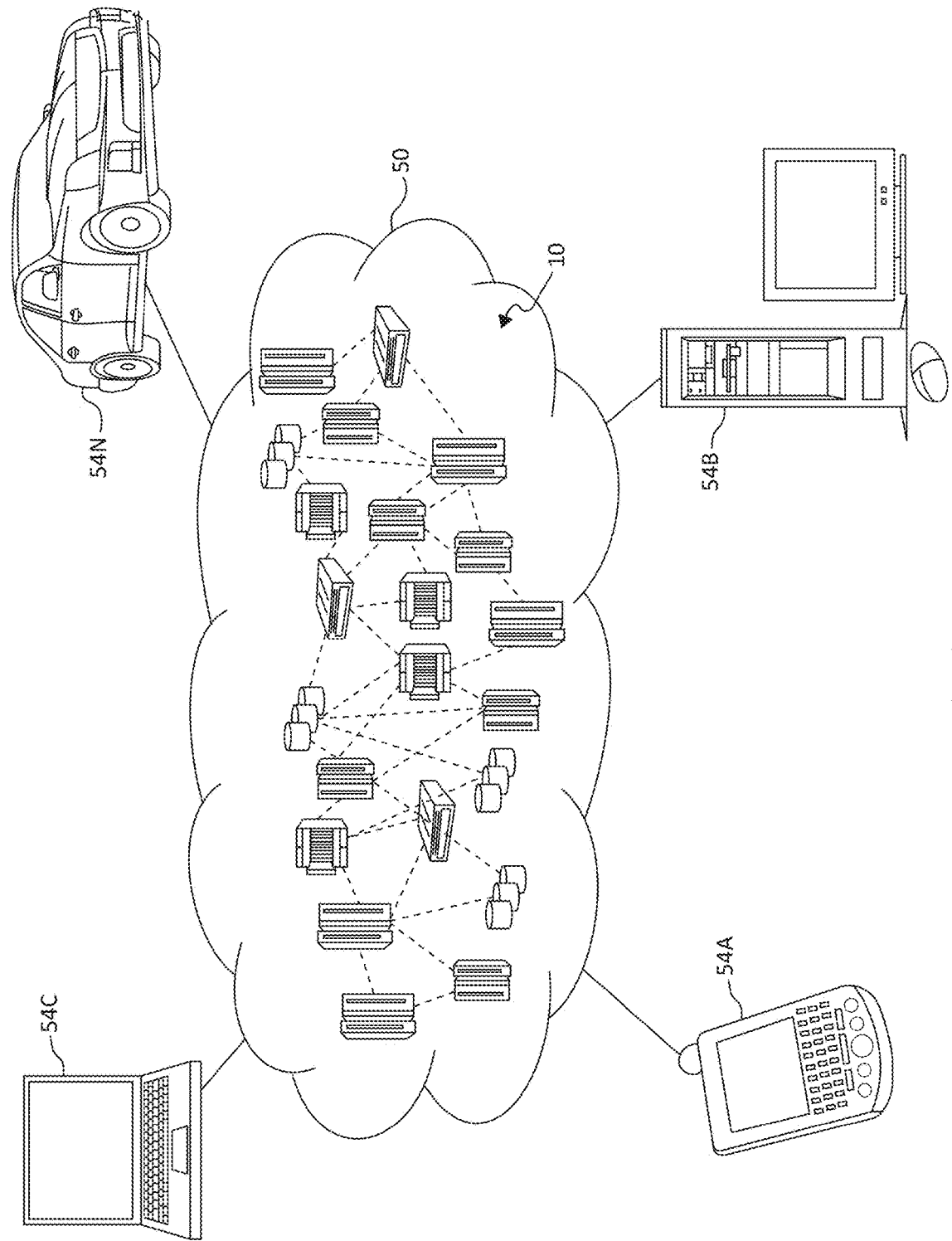
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, an intelligent ("smart") mattress 54D, and/or automobile computer system 54N may communicate. As used herein, a mattress such as, for example mattress 5D may be a pad, mat, cushion, foam, or object designed for supporting or reclining all or portions of a body such as, for example, a bed (or part of a bed), couch, sofa, recliner, seat, chair, or seat.

Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
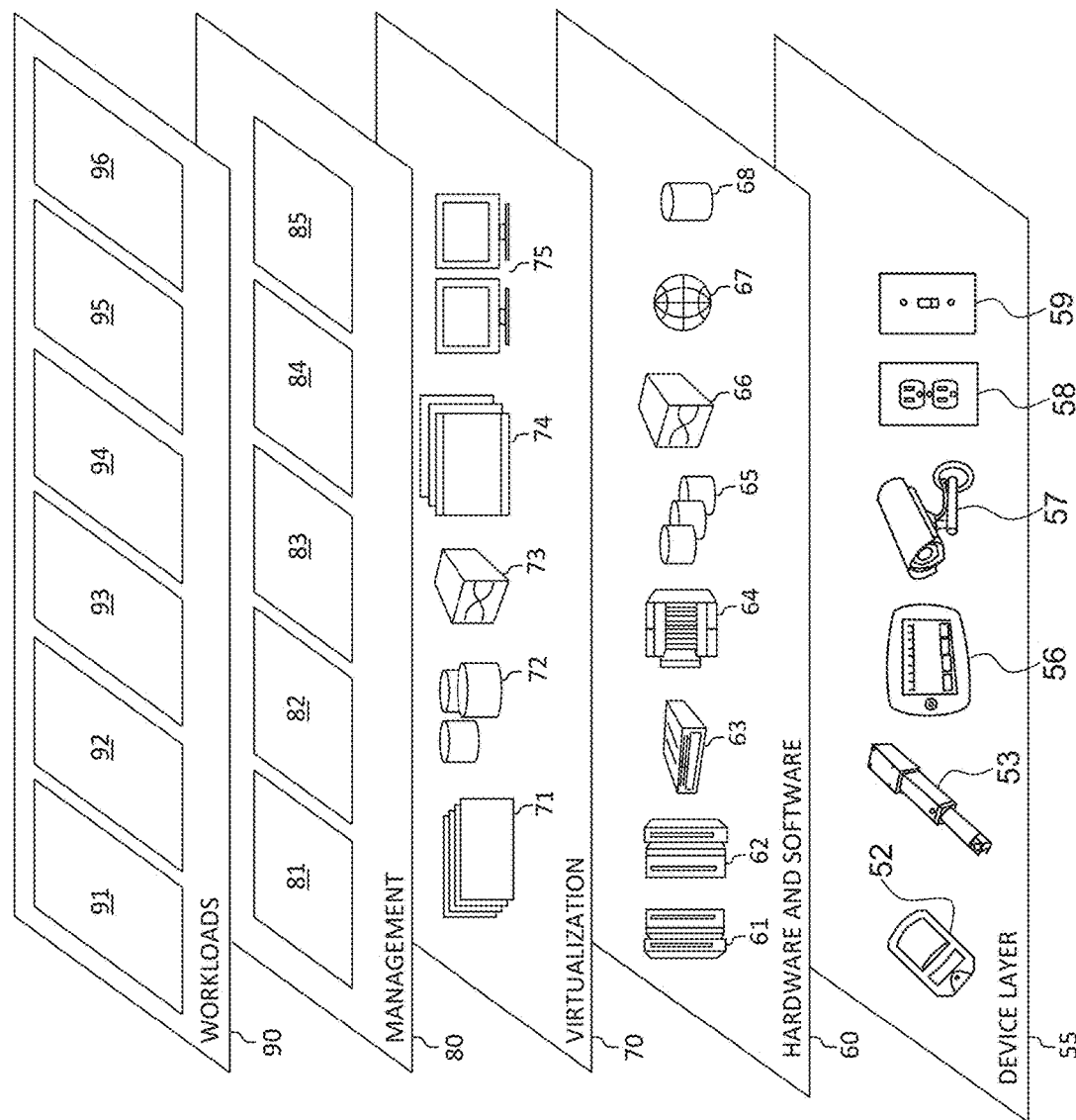
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various workloads and functions 96 for extending managed switching network to a virtualization layer in a computer. In addition, configuring settings for various workloads and functions 96 for extending managed switching network to a virtualization layer in a computer may include such operations as data analysis (including data collection and processing from various environmental sensors), networking, sending/receiving data, providing virtualization/virtual compute, encryptions, cloud computing communications, and/or management functions. One of ordinary skill in the art will appreciate that the configuring settings for various workloads and functions 96 for extending managed switching network to a virtualization layer in a computer may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As stated above, the present invention provides a novel solution enabling users to download and/or install a managed virtual switch application (e.g., a virtual switch) on the user's workstation (e.g., desktop/laptop) and allows VM's to connect to that managed virtual switch application. For example, a private VLAN may be extended into the virtual layer of a physical host. First, the host may be connected to the private VLAN (which, if that private VLAN is secured by 802.1X, involves authentication with the AAA server). However, if the VM on the physical host connects to the same network, the VM also needs to authenticate independently with the AAA server. So NAC can be applied at both the VM and the physical host layer. The preset invention enables the 802.1x authentication to the VM on that physical host.

Using the managed virtual switch at the user's workstation (e.g., desktop/laptop) allows for the following capabilities on the managed virtual switch application. First, the managed virtual switch application enables virtual routing and forwarding ("VRF") allowing the connected VM (e.g., a VM residing on a physical host on which the managed switch application is installed) to connect to a virtual network interface card ("VNIC") on a virtual local area network ("VLAN) that uses the VRF to connect to a guest network (or other corporate networks), even if the host machine is connected to the corporate network. Second, the managed virtual switch application enables 802.1X implementation. That is, the managed virtual switch application can forward extensible authentication protocol ("EAP") authentication requests to an Authentication, Authorization, and Access ("AAA") server prior to authenticating the virtual machine to the port. Third, the managed virtual switch application enables Network Access Control ("NAC"). The AAA server can perform network access control based on the identity of the VM and its compliance state. If the VM is not authorized due to non-compliance for the corporate network, the NAC can switch the VLAN of the virtual port to a remediation network.

Figure 4:
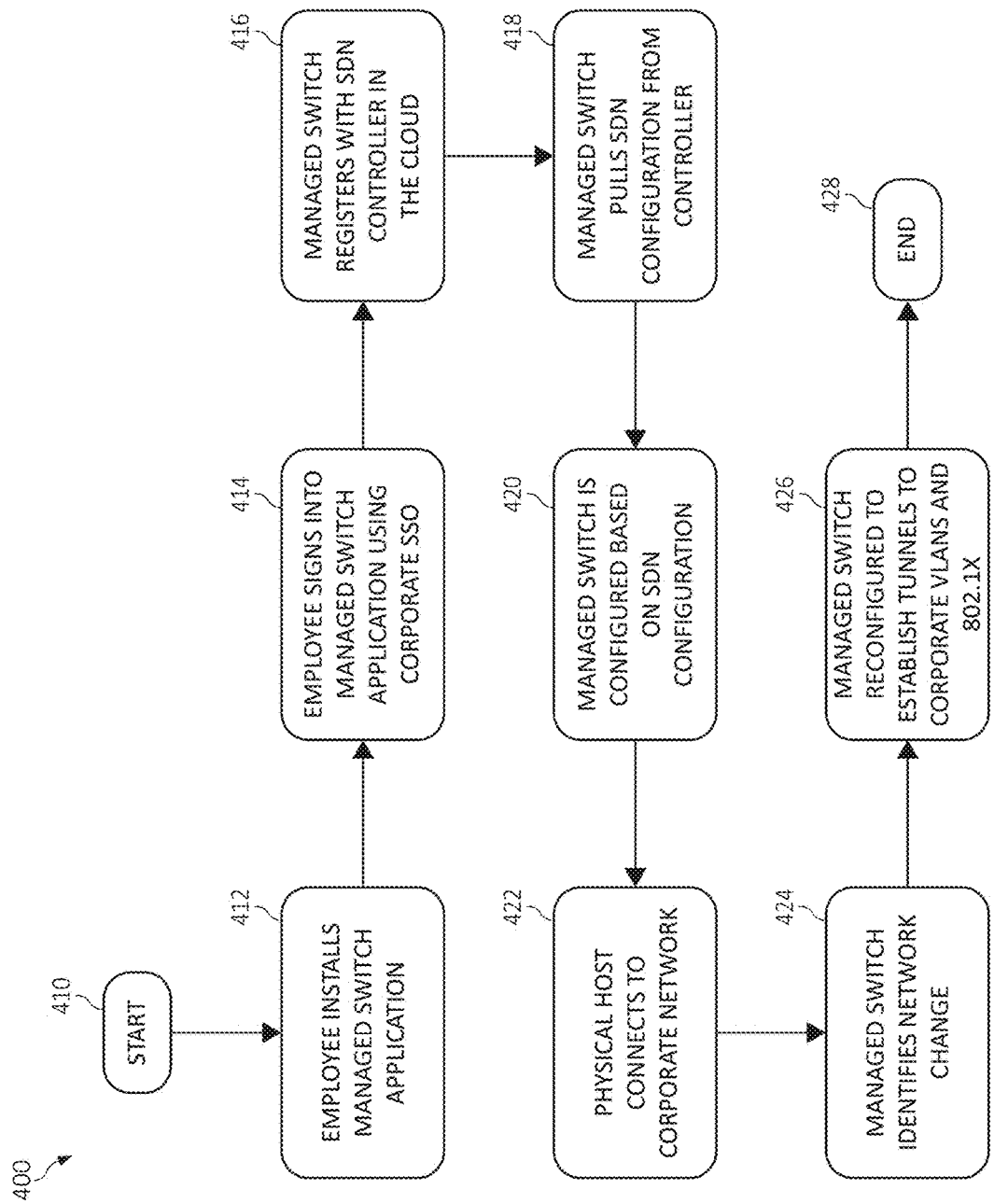
FIG. 4 is a flowchart diagram depicting an exemplary method for extending the security functionality of campus network switching to the virtualization layer in the computer environment in which various aspects of the present invention may be realized.

Turning now to FIG. 4, a method 400 for extending the security functionality of campus network switching to the virtualization layer in the computer environment is depicted. In one aspect, each of the devices, components, modules, operations, and/or functions described in FIGS. 1-3 also may apply or perform one or more operations or actions of FIG. 4. The functionality 400 may be implemented as a method executed as instructions on a machine, where the instructions are included on at least one computer readable medium or one non-transitory machine-readable storage medium. The functionality 400 may start in block 410.

A user (e.g., a user/employee of an entity/company) may install a managed virtual switch application (e.g., "managed switch application" on a local computer of the user), as in block 412. The user may sign into the managed virtual switch application using a single sign on ("SSO") (e.g., an SSO of an entity/company), as in block 414. The managed virtual switch application may register with a network controller (e.g., a software-defined networking "SDN" controller) that may be located in a cloud computing environment, as in block 416. The managed virtual switch application retrieves/pulls network configuration (e.g., SDN network configuration) data from the network controller, as in block 418. The managed virtual switch application may be configured according to the network configuration data (e.g., the retrieved SDN network configuration information), as in block 420.

A physical host (e.g., physical end user computing device such as, as desktop or laptop of the user) may connect to the network (e.g., a campus network/private network), as block 422. The managed virtual switch application may identify a change/switch to the network (e.g., changing from a first network to a second network such as, for example, the campus network/private network), as in block 424. The managed virtual switch application may be configured/reconfigured to establish tunnels to a virtual local area network ("VLAN), a virtual network interface card ("VNIC"), a port-based network access control protocols, or a combination thereof (e.g., establish tunnels to corporate network VLAN's and 802.1X), as in block 426. The functionality 400 may end, as in block 428.

Turning now to FIGS. 5A-5D, depicts computing system 500 deploying various exemplary embodiments for extending the security functionality of campus network switching to the virtualization layer in the computer. It should be noted that the descriptions and embodiments of FIGS. 1-4 be used in FIGS. 5A-5D. Repetitive description of like elements employed in other embodiments described herein (e.g., FIG. 4) is omitted for sake of brevity.

Figure 5A:
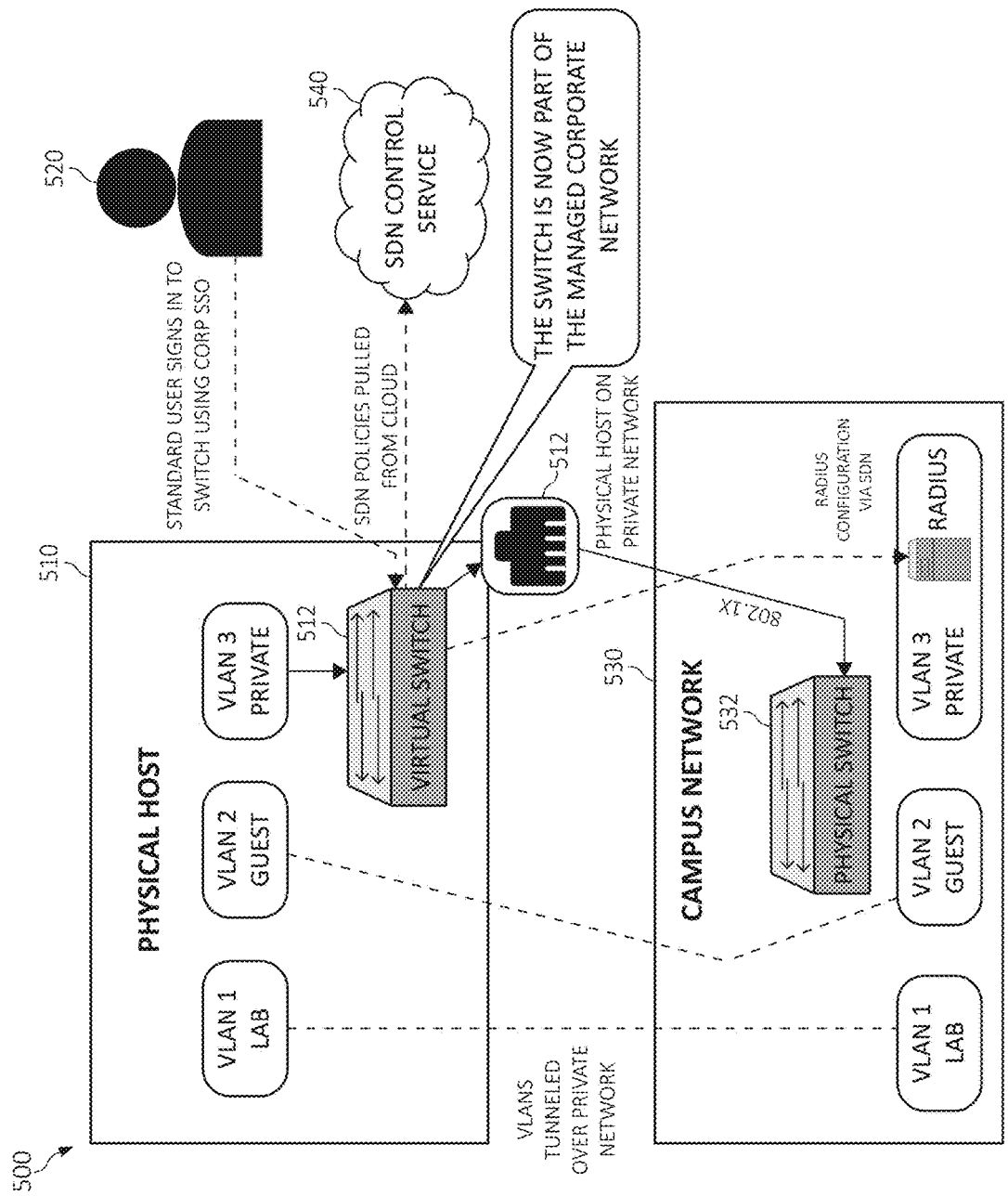
FIGS. 5A-5D illustrate various exemplary embodiments for extending the security functionality of campus network switching to the virtualization layer in the computer environment in which various aspects of the present invention may be realized.

As depicted in FIG. 5A, the computing system 500 includes a physical host 510 and a network 530 (e.g., a campus network 530). The physical host 510 may be a desktop of a user 520. The network 530 may include a physical switch 532. In one aspect, the network 530 may include a first VLAN (e.g., VLAN 1 Lab), a second VLAN (e.g., VLAN 2 Guest), and a third VLAN (e.g., VLAN 3 private) that may be in a radius configuration via an SDN.

The physical host 510 may connect to the network 530 (e.g., a private network) and install the virtual switch 512 on the physical host 510 for extending the security policy and authentication functionality of the network switching to the virtualization layer. As such, the virtual network 512 becomes part of the network 530 (e.g., the managed corporate network).

The user 520 may sign into (e.g., using an SSO of an entity/company) the virtual managed virtual switch application installed on the physical host 510 may according to an authentication operation and a cloud-based application defined networking controller and retrieve application-defined network configurations from the network 530 (e.g., pulling SDN policies pulled/received from a cloud computing environment), which may be enabled via a SDN control service 540.

The physical host 510 may consume networking access in a virtual environment as a service from the network 530 upon configuring the virtual switch 512 using the application-defined network configurations received from the network. The physical host 510 may configuring the virtual network 512 to establish one or more tunnels to a virtual local area network ("VLAN"), a virtual network interface card ("VNIC"), a port-based network access control protocols, or a combination thereof. That is, the virtual network 512 establishes one or more tunnels to the first VLAN (e.g., VLAN 1 Lab), the second VLAN (e.g., VLAN 2 Guest), and a third VLAN (e.g., VLAN 3 private). The virtual network 512 enables 802.1X implementation (e.g., a port-based network access control ("PNAC") providing an authorization mechanisms for the physical host 510 with the network 530.

Figure 5B:
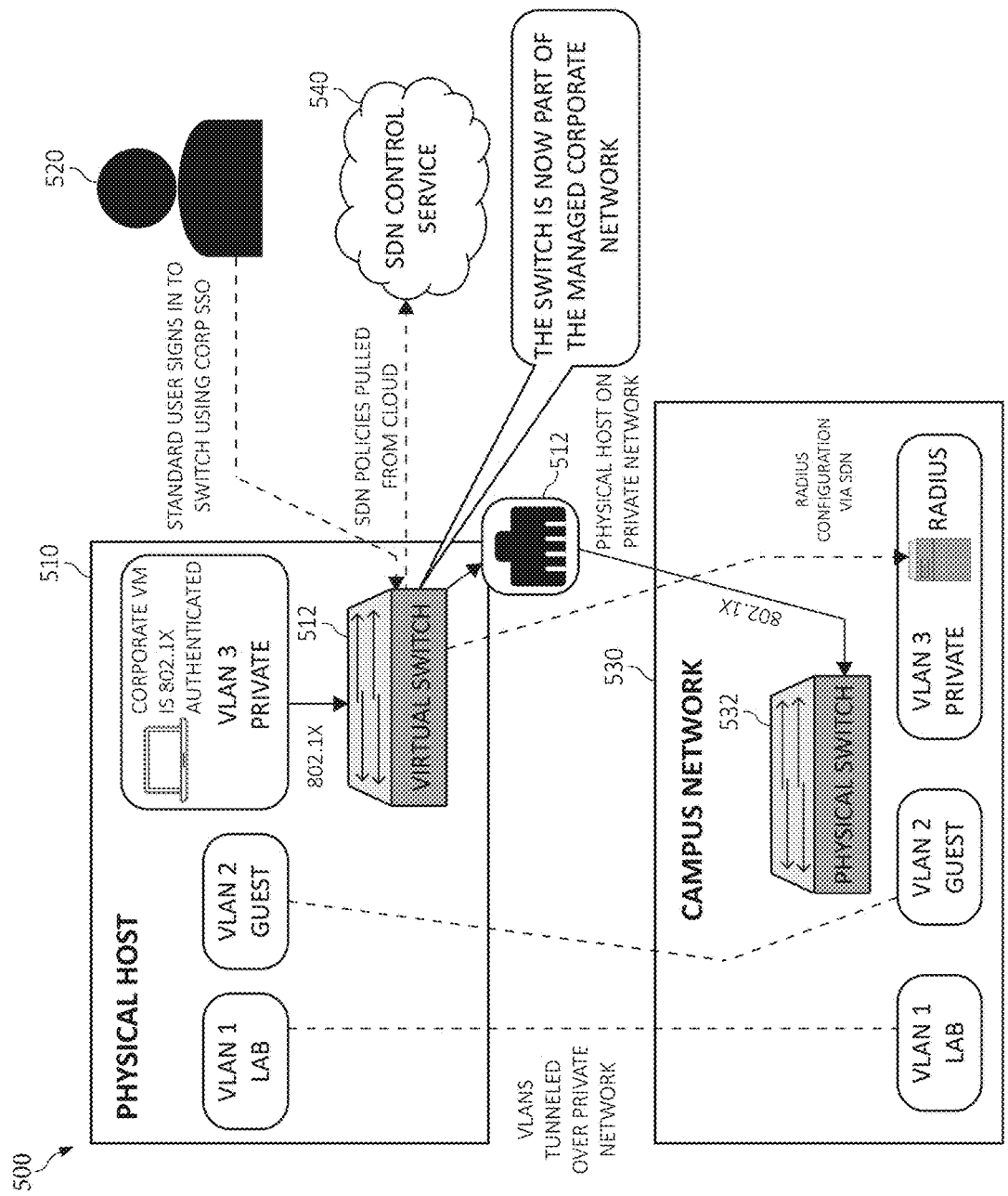

Turning now to FIG. 5B, consider the follow first operation for user 520 (e.g., a managed VM). The physical host 510 (e.g., corporate managed workstation) of user 520 is connected to the network 530 (e.g., a corporate campus network). The user 520 downloads and signs into a managed switch application (e.g., virtual switch 512) provided by the network 530 (e.g., provided by the corporation employing user 520). Again, the managed switch application is the virtual switch. That is, the virtualized switching component that is installed on a physical workstation.

User 520 installs a corporate managed VM (e.g., VLAN 3 private) with an appropriate extensible authentication protocol transport layer security ("EAP-TLS") certificate and authenticates with the managed switch application to gain access to the network 530 (e.g., corporate campus network). That is, the VLAN 3 may be a private corporate network that may be using 802.1x authentication.

Figure 5C:
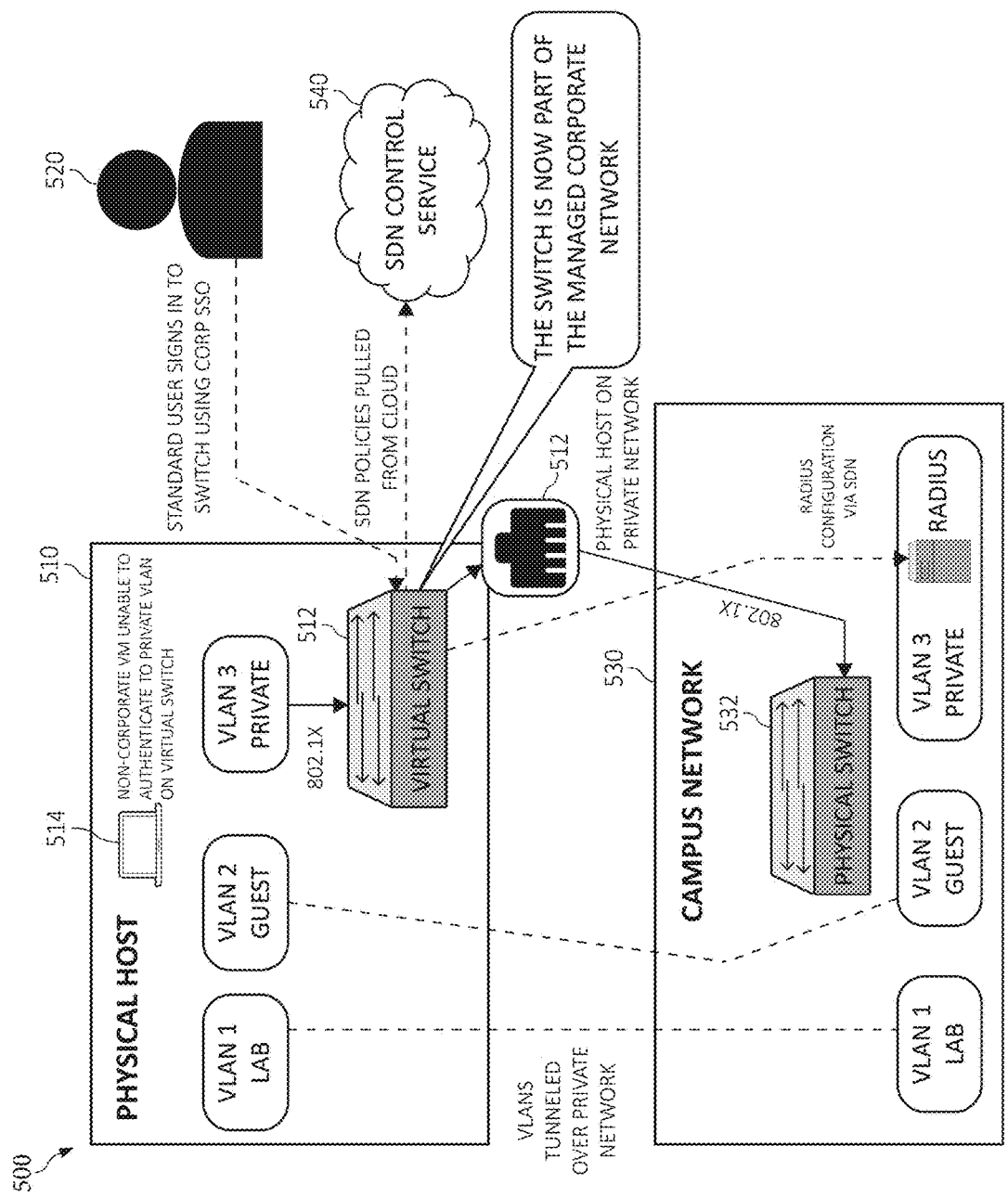

Turning now to FIG. 5C, consider the follow second operation for user 520 (e.g., unmanaged VM). The physical host 510 (e.g., corporate managed workstation) of user 520 is connected to the network 530 (e.g., a corporate campus network). The user 520 downloads and signs into a managed switch application (e.g., virtual switch 512) provided by the network 530 (e.g., provided by the corporation employing user 520). User 520 installs a non-corporate managed VM 514 that does not have the appropriate EAP-TLS certificate. The VM 514 is able to connect to the guest corporate network (e.g., VLAN 2 guest), even though the physical host 510 is connected to the network 530 (e.g., the private corporate network) because user 520 does not have the certificates to authenticate. The guest corporate network (e.g., VLAN 2 guest) on the managed physical switch 532 may be tunneled through the physical host 510, based on software defined networking (SDN) policies.

Figure 5D:
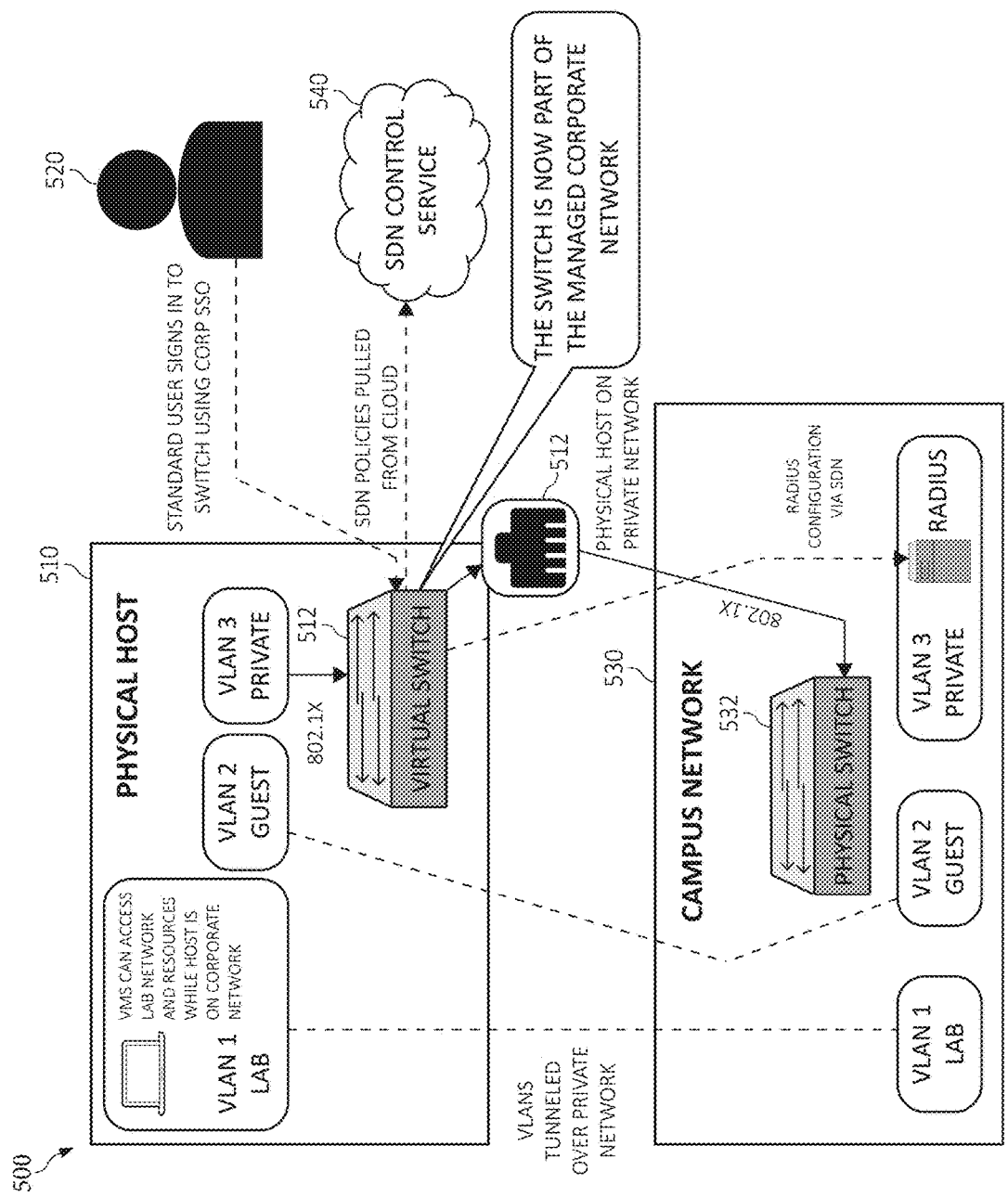

Turning now to FIG. 5D, consider the follow third operation for user 520 (e.g., lab environment). The physical host 510 (e.g., corporate managed workstation) of user 520 installs a VM (e.g., VLAN 1 lab) that needs to connect to the network 530 (e.g., a corporate campus network) for development purposes. The VM lab environment (e.g., the VLAN 1 lab) is in a segmented network on the network 530. The physical host 510 of the user 520 is connected the network 530 (e.g., corporate private network that is non-lab). User 520 installs the managed virtual switch 512 and the Lab VLAN e.g., the VLAN 1 lab) is configured on the managed switch 512 and routed to the lab networking using VRF as defined by the SDN configuration. User 520 virtual machine (e.g., VLAN 1 lab) is segmented from the network 530 (e.g., the private corporate network) and has seamless connectivity to the lab network (e.g., e.g., the VLAN 1 lab in network 530).

Figure 6:
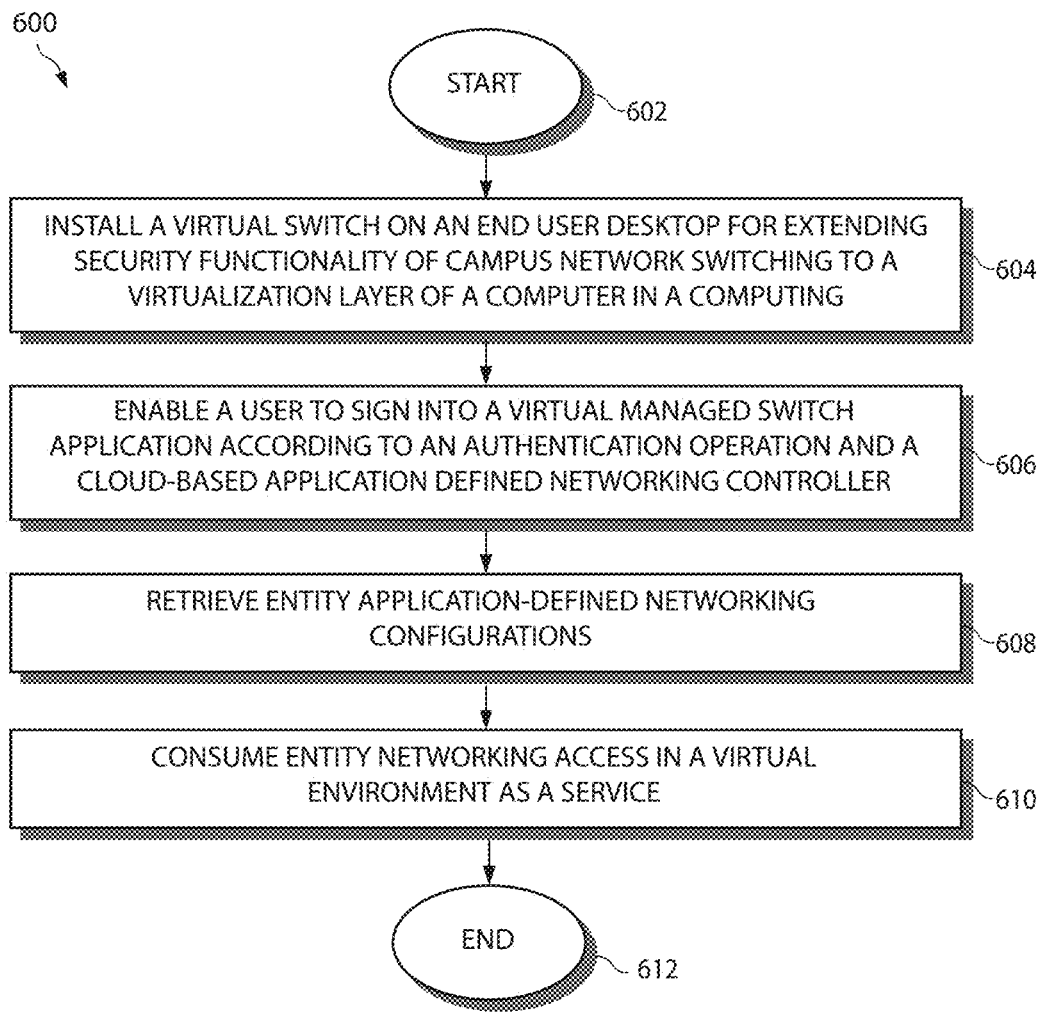
FIG. 6 is a flowchart diagram depicting an exemplary method for extending the security functionality of campus network switching to the virtualization layer in the computer environment, again in which various aspects of the present invention may be realized.

Turning now to FIG. 6, a method 600 for extending the security functionality of campus network switching to the virtualization layer in a workstation (e.g., a computer of a user) in the computer environment is depicted. In one aspect, each of the devices, components, modules, operations, and/or functions described in FIGS. 1-5A-5D also may apply or perform one or more operations or actions of FIG. 6. The functionality 600 may be implemented as a method executed as instructions on a machine, where the instructions are included on at least one computer readable medium or one non-transitory machine-readable storage medium. The functionality 600 may start in block 602.

A virtual switch may be installed on a computer of an end user for extending security functionality of campus network switching to a virtualization layer of a computer in a computing environment, as in block 604. The user may be enabled to sign into a virtual managed switch application according to an authentication operation and a cloud-based application defined networking controller, as in block 606. Entity application-defined networking configurations may be retrieved, as in block 608. Entity networking access may be consumed in a virtual environment, as in block 610. The functionality 600 may end, as in block 612.

In one aspect, in conjunction with and/or as part of at least one block of FIG. 6, the operations of method 600 may include each of the following. The operations of method 600 may implement security policy and authentication functionality in a virtualization layer of a virtual switch locally installed on a computer of a user for network switching in a network.

The operations of method 600 may install the virtual switch on the computer of a user for extending the security policy and authentication functionality of the network switching to the virtualization layer, wherein the network is a private network and enable the user to sign into a virtual managed virtual switch application installed on the computer according to an authentication operation and a cloud-based application defined networking controller.

The operations of method 600 may retrieve application-defined network configurations from the network and/or consume networking access in a virtual environment as a service.

The operations of method 600 may configure the virtual switch using application-defined network configurations received from the network, identify a change to the network via the virtual network, and/or configure or reconfigure the virtual network to establish one or more tunnels to a virtual local area network ("VLAN), a virtual network interface card ("VNIC"), a port-based network access control protocols, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or host servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for extending managed switching network in a computing environment, comprising:
   implementing security policy and authentication functionality in a virtualization layer of a virtual switch locally installed on a computer of a user for network switching in a restricted network of an institutional enterprise, wherein, to automatically configure the security policy and authentication functionality, the user being non-privileged signs into a virtual managed virtual switch application installed on the computer using an authentication operation; and
   responsive to signing into the virtual managed virtual switch application on the computer, automatically registering the virtual managed virtual switch application with a cloud-based software-defined networking (SDN) controller remotely located from the computer, wherein, responsive to automatically registering the virtual managed virtual switch application with the cloud-based SDN controller, SDN network configuration data is retrieved by the virtual managed virtual switch application from the cloud-based SDN controller to configure the virtual switch to extend the restricted network and remote access services of the institutional enterprise onto the virtualization layer of the computer.

2. The method of claim 1, further including consuming networking access in a virtual environment as a service.

3. The method of claim 1, further including:
   identifying a change to the restricted network via a virtual network; or
   configuring the virtual network to establish one or more tunnels to a virtual local area network (VLAN), a virtual network interface card (VNIC), a port-based network access control protocols, or a combination thereof.

4. A system for extending managed switching network in a computing environment, comprising:
   one or more computers with executable instructions that when executed cause the system to:

implement security policy and authentication functionality in a virtualization layer of a virtual switch locally installed on a computer of a user for network switching in a restricted network of an institutional enterprise, wherein, to automatically configure the security policy and authentication functionality, the user being non-privileged signs into a virtual managed virtual switch application installed on the computer using an authentication operation; and responsive to signing into the virtual managed virtual switch application on the computer, automatically register the virtual managed virtual switch application with a cloud-based software-defined networking (SDN) controller remotely located from the computer, wherein, responsive to automatically registering the virtual managed virtual switch application with the cloud-based SDN controller, SDN network configuration data is retrieved by the virtual managed virtual switch application from the cloud-based SDN controller to configure the virtual switch to extend the restricted network and remote access services of the institutional enterprise onto the virtualization layer of the computer.

5. The system of claim 4, wherein the executable instructions consume networking access in a virtual environment as a service.

6. The system of claim 4, wherein the executable instructions:
    identify a change to the restricted network via a virtual network; or
    configure the virtual network to establish one or more tunnels to a virtual local area network (VLAN), a virtual network interface card (VNIC), a port-based network access control protocols, or a combination thereof.

7. A computer program product for, by a processor, extending managed switching network in a computing environment, the computer program product comprising a non-transitory computer-readable storage medium having computer-readable program code portions stored therein, the computer-readable program code portions comprising:
    an executable portion that implements security policy and authentication functionality in a virtualization layer of a virtual switch locally installed on a computer of a user for network switching in a restricted network of an institutional enterprise, wherein, to automatically configure the security policy and authentication functionality, the user being non-privileged signs into a virtual managed virtual switch application installed on the computer using an authentication operation; and
    an executable portion that, responsive to signing into the virtual managed virtual switch application on the computer, automatically registers the virtual managed virtual switch application with a cloud-based software-defined networking (SDN) controller remotely located from the computer, wherein, responsive to automatically registering the virtual managed virtual switch application with the cloud-based SDN controller, SDN network configuration data is retrieved by the virtual managed virtual switch application from the cloud-based SDN controller to configure the virtual switch to extend the restricted network and remote access services of the institutional enterprise onto the virtualization layer of the computer.

8. The computer program product of claim 7, further including an executable portion that consumes networking access in a virtual environment as a service.

9. The computer program product of claim 7, further including an executable portion that:
    identifies a change to the network via a virtual network; or
    configures the virtual network to establish one or more tunnels to a virtual local area network (VLAN), a virtual network interface card (VNIC), a port-based network access control protocols, or a combination thereof.

* * * * *